(12) United States Patent
Cortés Santaolalla et al.

(10) Patent No.: US 9,130,673 B2
(45) Date of Patent: Sep. 8, 2015

(54) SYSTEM FOR THE CERTIFICATION OF A PASSIVE OPTICAL NETWORK AND FOR THE DETECTION OF PROBLEMS AND FAULTS IN THE LAST FIBRE LEGS

(75) Inventors: Francisco Javier Cortés Santaolalla, La Muela (ES); Gonzalo Pedro Rodrigo Álvarez, La Muela (ES); Octavio Benedí Sánchez, La Muela (ES); Héctor Fernández Gracia, La Muela (ES); Adrián Pérez Resa, La Muela (ES); Amador Pozo Espinosa, La Muela (ES); Carlos Vicastillo Barrabés, La Muela (ES)

(73) Assignee: TELNET REDES INTELIGENTES, S.A., La Muela (Zaragoza) (ES)

( * ) Notice: Subject to any disclaimer, the term of this patent is extended or adjusted under 35 U.S.C. 154(b) by 169 days.

(21) Appl. No.: 14/006,110

(22) PCT Filed: Mar. 21, 2012

(86) PCT No.: PCT/ES2012/070179
§ 371 (c)(1),
(2), (4) Date: Jan. 29, 2014

(87) PCT Pub. No.: WO2012/127091
PCT Pub. Date: Sep. 27, 2012

(65) Prior Publication Data
US 2014/0161441 A1    Jun. 12, 2014

(30) Foreign Application Priority Data
Mar. 23, 2011 (ES) .................................. 201130415

(51) Int. Cl.
*H04B 10/08* (2006.01)
*H04B 10/079* (2013.01)
(Continued)

(52) U.S. Cl.
CPC .......... *H04B 10/0791* (2013.01); *H04B 10/073* (2013.01); *H04B 10/27* (2013.01); *H04B 10/272* (2013.01); *H04J 14/02* (2013.01); *H04Q 11/0067* (2013.01)

(58) Field of Classification Search
CPC ............. H04B 10/071; H04B 10/0791; H04B 10/0795; H04B 10/07955; H04B 10/0793; H04B 10/07953; H04B 10/0773; H04B 10/0775; H04B 10/07; H04B 10/27
USPC ........... 398/20, 16, 17, 13, 21, 33, 38, 25, 27, 398/22, 23, 24, 30, 66, 67, 68, 70, 71, 72, 398/98, 99, 100, 79; 356/73.1
See application file for complete search history.

(56) References Cited

U.S. PATENT DOCUMENTS 8,090,258 B2 * 1/2012 DeLew et al. .................... 398/22
8,442,398 B2 * 5/2013 Li et al. ............................ 398/16
(Continued)

OTHER PUBLICATIONS

International Search Report issued Jul. 19, 2012 in International (PCT) Application No. PCT/ES2012/070179.

*Primary Examiner* — Hanh Phan
(74) *Attorney, Agent, or Firm* — Wenderoth, Lind & Ponack, L.L.P.

(57) ABSTRACT

The invention relates to a system for the certification of a passive optical network and for the detection of problems and faults in the last fibre legs, which is suitable for use in passive optical networks which, between the OLT device housed in a telephone central office and the user device of ONT, includes optical dividers or splitters which, in the downward direction, distribute the optical signal to all of the users within a tree-and-branch architecture, and in the upward direction, combine the optical signals from all of the ONTs. The system is based on the incorporation of a group of devices known as an OLT emulator and a remote testing unit which are joined to the corresponding wall socket of the telephone central office and user, such that the remote testing unit is positioned facing an OLT in operation, allowing the certification of the last leg of the optical network and the detection of problems and faults in a PON network in operation.

9 Claims, 7 Drawing Sheets

(51) Int. Cl.
*H04B 10/073* (2013.01)
*H04B 10/272* (2013.01)
*H04B 10/27* (2013.01)
*H04J 14/02* (2006.01)
*H04Q 11/00* (2006.01)

(56) References Cited

U.S. PATENT DOCUMENTS

| | | |
|---|---|---|
| 2006/0198634 A1 | 9/2006 | Ofalt et al. |
| 2008/0232794 A1 | 9/2008 | Absillis et al. |
| 2009/0324228 A1 | 12/2009 | Bernard et al. |
| 2010/0074614 A1 | 3/2010 | Delew et al. |

* cited by examiner

SYSTEM FOR THE CERTIFICATION OF A PASSIVE OPTICAL NETWORK AND FOR THE DETECTION OF PROBLEMS AND FAULTS IN THE LAST FIBRE LEGS

OBJECT OF THE INVENTION

The present invention, as expressed in the wording of this specification, relates to a system for the certification of a passive optical network and for the detection of problems and faults in the last fibre legs, which object is the incorporation of a set of devices known as OLT Emulator and Remote Testing Unit (hereinafter referred to as RTUs) which, together, may be used by installers to certify the ringing of the network in a first deployment phase; secondly, when the RTU is facing an OLT in operation, they may be used in a second deployment phase, certifying the last optical network leg (and detecting the optical power level of the reflections, if any), and thirdly, the RTU also allows the detection of problems and faults in a PON network in operation.

In a variant of a practical embodiment, between the optical subscriber wall socket and the user device or ONT (Optical Network Terminator) and the Remote Testing Unit (RTU), it incorporates a step coupler (SC), allowing the verification of the operating functions of an ONT connected to the optical network.

FIELD OF APPLICATION

The present specification describes a system for the certification of a passive optical network and for the detection of problems and faults in the last fibre legs, which is applicable to the telecommunications field, and more specifically, to the testing of fibre and communications in passive optical networks (PON).

BACKGROUND OF THE INVENTION

The constant demand from residential users of a higher transfer rate, along with the reduction of costs per user of access architectures, have made telecommunication operators think about the replacement of the traditional point-to-point access architectures based on the conventional collection telephone pair with fully passive PON (Passive Optical Networks) point-to-multipoint optical fibre architectures.

Likewise, GPON (Gigabit-Capable Passive Optical Network) technology, EPON (Ethernet Passive Optical Network) and their future speed variants (XGPON-1, XGPON-2, EPON NG), allow offering users elevated bandwidths (above 100 Mbps) and containing the network infrastructure deployment costs for being from a shared media.

There are no active devices in a passive optical network between the OLT (Optical Line Terminal) device located in the telephone central office and the user device or ONT (Optical Network Terminator) located at the domicile of the user. Alternatively, passive optical devices, known as optical dividers or splitters, are introduced which in the downward direction, distribute the optical signal to all of the users within a tree-and-branch architecture using a certain wavelength (normally 1490 nm) and in the upward direction, combine the optical signals from all of the ONTs using a TDM (Time Division Multiplexing) type time division system, usually transmitting in the 1310 nm wavelength.

The use of two supplementary transmission and reception windows allows the use of a monofibre plant for FTTH (Fibre to the Home) deployments instead of the traditional bi-fibre architectures for dedicated transmission and reception.

When an operator decides to offer a PON access system, it usually organizes a two-phase deployment strategy: in the first phase, the installation units of the operators (companies subcontracted by the operators) install the external plant fibre from a dispatcher of the telephone central office until the termination points of the premises of the Common Telecommunication Infrastructures (CTIs) of the subscribers.

During this phase, the installers certify the correct installation of the plant fibres by means of a physical verification using OTDR (Optical Time Domain Reflectometer) tools, modified to test point-multipoint topologies.

The objective of this phase, also known as network ringing, is to guarantee that the optical budget measured by the OTDR is lower than the one available between the OLT and the different ONTs according to the degree of division or splitting selected. Once the fibre testing is completed, the OLTs devices are installed in the telephone central office and the operator waits for the sign-up requests from the different customers.

The second phase of the installation begins when a user requests to be signed-up by the operator, which consists in physically connecting a vacant optical fibre spot of the PON from the terminating cabinet of the CTI premises to the network termination wall socket of the domicile of the subscriber. To achieve the foregoing, a dedicated monofibre laid by the installer company between the two points is used.

The correct installation of this optical fibre interconnection is crucial so the user has no problems with the traffic services to be exchanged with the telephone central office.

One of the effects fought against by installer companies in this phase is the presence of reflections in these last meters of fibre.

A defect in this last fibre leg or in its optical connectors causes a part of the power to reflect and to return to the ONT, thus decreasing the effective power reaching the OLT in the upward link and degrading the provision of the access services.

In order to control this effect, given that the fibre is already connected to the PON infrastructure and usually (due to reasons of simplicity and cost, the fibre network does not have optical filters to limit an injected signal coming from a measuring element) it is not possible to inject a signal coming from a tapped OTDR in the user wall socket because the signal generated in a continuous manner by this last element could disrupt the active elements of the other users, thus interrupting the access service during the sign-up process of new customers.

In the majority of the cases, installers choose to connect an ONT that is similar to the ONT of the user (or the user's own ONT), verifying that the ONT is synchronised with the OLT by deeming the installation as correct, without taking into account whether it is possible to establish the same or their quality of service/experience.

Traditional OTDR-based solutions, such as the one detailed in European patent 99202206.1, exclusively work on a physical level, while the solution proposed in the present specification is capable of working at a physical level and at a services level by measuring the quality thereof as perceived by the user (QoS) and by simulating the same operating conditions to be found by the user.

European patent application 94200753.5 includes an optical circuit to measure the sensitivity of an optical transmission system to reflections. However, in this case, this circuit is not applicable to the detection of reflections in a monofibre PON scenario.

Patent application 200400037 also presents an optical measurement system capable of using reflections to carry out a measurement diagnostic. However, its scope is limited to the use of sensorisation and is not applicable to the field of PON networks.

DESCRIPTION OF THE INVENTION

The present specification describes a system for the certification of a passive optical network and for the detection of problems and faults in the last fibre legs, which is suitable for use in passive optical networks which, between the OLT device housed in a telephone central office and the user device of ONT, connected to the corresponding wall socket, and including optical dividers or splitters which, in the downward direction, distribute the optical signal to all of the users within a tree-and-branch architecture, and in the upward direction, combine the optical signals from all of the ONTs, using two supplementary transmission and reception windows with the use of a monofibre plant for the FTTH deployments, such that the system comprises:

- a portable and autonomous OLT emulator device connected to the wall socket to access the plant infrastructure; and
- a remote testing unit (RTU) connected to the subscriber wall socket such that the OLT emulator comprises:

- an FPGA implementing the GPON protocol on at least a first electro-optical module connectable to different PON networks with the capacity to measure optical power and flash memory and RAM peripherals;
- a packet processor, connected to the FPGA to generate the service traffic to be tested, and a second microprocessor dedicated to the control of the provision and testing functions;
- at least one external USB external data port and an Ethernet port to connect to an external PC to update firmware, while the remote testing unit (RTU) comprises:

- a GPON chipset or an FPGA with an embedded microprocessor with flash memory and RAM peripherals;
- an ONT electro-optical module, joined to the chipset or FPGA, to measure the optical power received;
- an optical circuit capable of separating reflected light and sending it to an OLT electro-optical module with the capacity to measure power and the distance at which the reflection is produced;
- a first optical filter that communicates with the ONT electro-optical module capable of separating the downward wavelength from the upward wavelength;
- an optical circulator with a first port (P1) connected at the output of a first electro-optical filter, as well as with a second port (P2) connected to a second electro-optical filter to recover the monofibre signal along with the signal coming from the first electro-optical filter, and a third port (P3) connected to an OLT electro-optical module;
- a PIN that can be activated to detect the reflections of the connections emitted in the OLT electro-optical module and which PIN is connected to a digital logic block that communicates with the activation of the burst transmission of the ONT electro-optical module;
- an optical fibre coil connected to an optical connector;
- an external connector for the connection to an external PC; and
- a high-capacity battery block.

When the RTU faces an OLT emulator, it allows the characterization or the ringing of a PON architecture by testing the attenuation of all the branches until the CTI premises, as well as the establishment and verification of the negotiation procedures based on the protocol used in the PON.

When the RTU faces an OLT in operation, it allows verifying the installation of the last fibre leg (6) connecting the CTI premises with the user wall socket by checking physical parameters, such as the power received and the reflection level, parameters of the link layer such as the negotiation and the bit error rate, and parameters of the quality of service (QoS) and of the quality of experience (QoE), all of which is carried out without disrupting the traffic of the rest of the PON users.

When the RTU faces an OLT in operation, it allows the detection of failures and faults with respect to the complaints of customers in an operating access circuit by checking physical parameters such as the power received and the reflection level, parameters of the link layer such as the negotiation and the bit error rate, and parameters of the quality of service (QoS) and of the quality of experience (QoE), all of which is carried out without disrupting the traffic of the rest of the PON users.

The optical circuit is capable of separating the upward light in the burst that is not generated by the RTU and to measure its power.

Likewise, the internal electronic circuit of the FPGA measures, with a precision of 5 ns., the time elapsed from the initiation of the ONT electro-optical module until the detection of the signal by the OLT electro-optical module, thus measuring the distance to a possible reflection in the fibre.

Likewise, the internal electronic circuit of the FPGA, by means of the OLT electro-optical module, detects light bursts at 1310 nm. that are not generated by the RTU, and measures their power.

On the other hand, in a practical embodiment, a step coupler (SC) is incorporated between the optical subscriber wall socket and the user device or user ONT and connects the Remote Testing Unit (RTU) to a test port of the step coupler (SC), the Remote Testing Unit (RTU) being able to measure the power received by the user device or user ONT and the power transmitted by the same and to verify in an automatic manner whether said power is within certain parameters, including said information in a final report about the installation and the connected active devices.

The step coupler SC (64) comprises:

- three optical connectors, two of them, one in the PON port and the other in the ONT port of the step coupler SC, to connect between the optical subscriber wall socket and the user ONT, and the other, in the test port of the step coupler SC to connect to the RTU;
- a first and a second optical filter that separate the two optical transmission windows;
- a first and a second optical divider that extract a percentage of the signals contained in the extracted optical windows;
- a third WDM optical filter that will concentrate the extracted signals in a single optical port.

In order to supplement the description to be made below, and with the purpose of aiding a better comprehension of the invention, a set of plans accompany the present specification which figures represent the most characteristic details of the invention in an illustrative rather than limitative manner.

DESCRIPTION OF A PREFERRED EMBODIMENT

Figure 1:
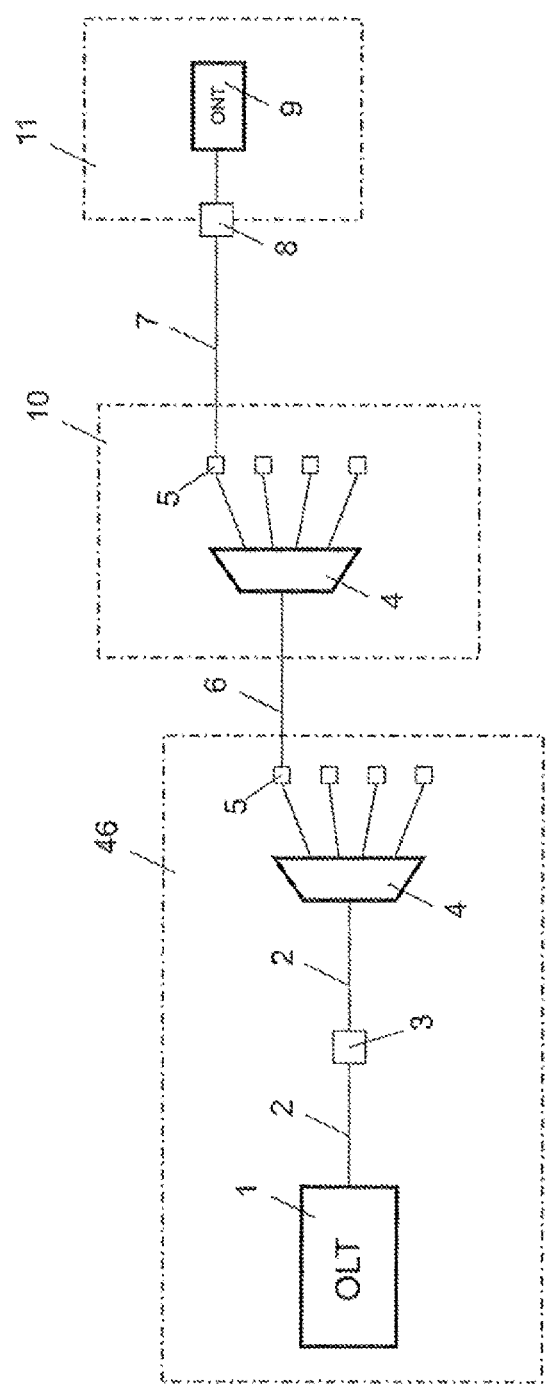
FIG. 1. Shows a scheme of a conventional passive optical network (PON).

In FIG. 1, we can see a conventional passive optical network, where there is no active device between the OLT (Optical Line Terminal) device 1, located in the telephone central office 46, and the user device or ONT (Optical Network Terminator) 9, located at the domicile 11 of the user.

Alternatively, passive optical devices, known as optical dividers or splitters 4 are introduced which, in the downward direction distribute the optical signal to all of the users within a tree-and-branch architecture using a certain wavelength (normally 1490 nm) and in the upward direction, combine the optical signals from all of the ONTs using a TDM (Time Division Multiplexing) type time division system, usually transmitting in the 1310 nm wavelength.

The use of two supplementary transmission and reception windows allows the use of a monofibre plant 2, 6, 7 for FTTH deployments, instead of the traditional bi-fibre architectures for dedicated transmission and reception.

When an operator decides to offer PON access systems, they usually organize a two-phase deployment strategy:
in a first phase, the installation units of the operators (companies subcontracted by the operators) install the external plant fibre from a dispatcher or wall socket 3 of the telephone central office 46 until the termination points 5 of the premises of the Common Telecommunication Infrastructures (CTIs) 10 of the subscribers.

In this phase, the installers certify the correct installation of the plant fibres by means of a physical verification using OTDR (Optical Time Domain Reflectometer) tools, modified to test point-multipoint topologies.

The objective of this phase, also known as network ringing, is to guarantee that the optical budget measured by the OTDR is lower than the one available between the OLT and the different ONTs according to the degree of division or splitting selected. Once the fibre testing is completed, the OLTs devices are installed in the telephone central office and the operator waits for the sign-up requests from the different customers.

The second phase of the installation begins when a user requests to be signed-up by the operator, which consists in physically connecting a vacant optical fibre spot (outlet) 5 of the PON from the terminating cabinet of the CTI premises 10 to the network termination wall socket 8 of the domicile 11 of the subscriber.

To achieve the foregoing, a dedicated monofibre 7 laid by the installer company between the two points is used. The correct installation of this optical fibre interconnection is crucial so the user has no problems with the traffic services to be exchanged with the telephone central office.

One of the effects fought against by installer companies in this phase is the presence of reflections in these last meters of fibre.

A defect in this last fibre leg 7 or in its optical connectors causes a part of the power to reflect and to return to the ONT, thus decreasing the effective power reaching the OLT in the upward link and degrading the provision of the access services.

In order to control this effect, given that the fibre is already connected to the PON infrastructure and usually (due to reasons of simplicity and cost, the fibre network does not have optical filters to limit an injected signal coming from a measuring element) it is not possible to inject a signal coming from a tapped OTDR in the user wall socket 8 because the signal generated in a continuous manner by this last element could disrupt the active elements of the other users, thus interrupting the access service during the sign-up process of new customers.

In the majority of the cases, installers choose to connect an ONT that is similar to the ONT of the user (or the user's own ONT), verifying that the ONT is synchronised with the OLT by deeming the installation as correct, without taking into account whether it is possible to establish the same or their quality of service/experience.

Figure 2:
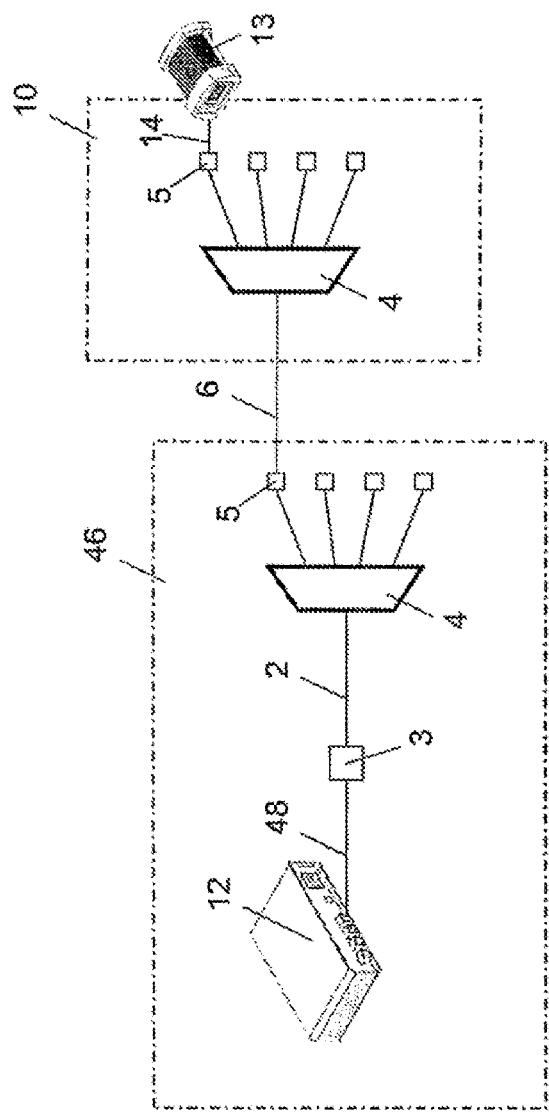
FIG. 2. Shows a detail view of how the invention alternates with the network to certify phase 1, consisting of the ringing or verification of the network up to the CTI premises.

FIG. 2 shows the scheme of a PON network which optical fibre and which passive optical components have just be deployed towards the CTI premises 10, and on which the installer desires to carry out the ringing by calculating the attenuations of all the branches of the network (deployment phase 1). To achieve the foregoing, it will connect the first device object of the invention, referred to as OLT Emulator 12, to the wall socket 3, which provides access to the plant infrastructure by means of a perfectly characterized optical fibre pigtail. The OLT emulator is a portable device that admits several types of power supply (AC and DC), and which objectives are the following:
To allow the reading of the optical powers of the RTUs 13 for calculating the optical power in the upward direction (physical level).
To allow the establishment of link level services by using the same registration mechanisms than an OLT in operation.
To measure the upward bit error rate.
To allow the establishment of services via OMCI (ONT Management Control Interface) with the RTUs and to generate service connections to check the Quality of Experience (QoE).

Once the OLT emulator 12 is connected, the installer will connect each one of the outlets 5 of the PON of the CTI premises 10 in a sequential manner by means of a perfectly characterized optical fibre pigtail 14, a Remote Testing Unit 13, the second component of this invention. The RTU will complete the analysis of each one of the branches of the PON as follows:
It will measure the downward power received by the OLT emulator and will request the upward power reading service from the emulator to fully characterize the attenuation of the path.
It will request the establishment of the link level from the OLT emulator by activating the negotiation mechanisms.
It will measure the downward bit error rate and will request the upward error rate from the ONT emulator.
It will establish services via OMCI and will check the quality of experience in the established services.

After carrying out these steps, the RTU will generate an exhaustive report with the diagnostics of the tests and will sign it digitally by means of the RSA (Rivest, Shamir and Alderman) cryptographic algorithm or its equivalent, the installer being able to download it by means of a PC or similar to take it to the information systems containing the characterization of the fibres of the operator. This way, the signed reports cannot be altered by the installers themselves and faithfully reflect the state of the network measurements.

Figure 3:
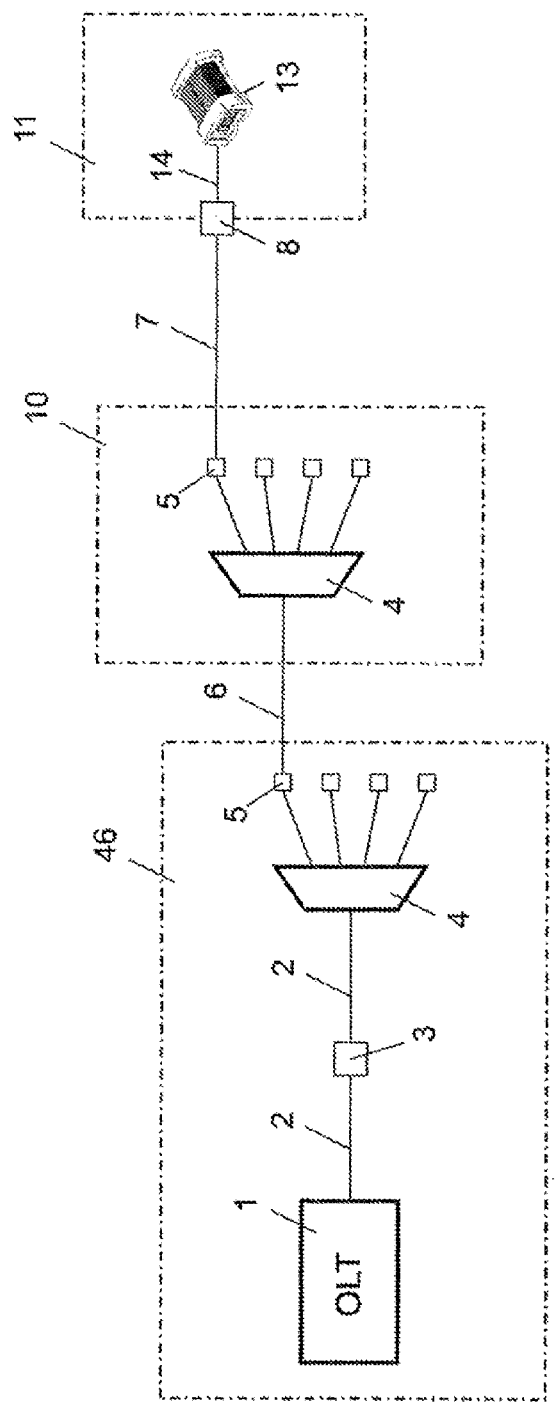
FIG. 3. Shows the detail of how the invention alternates with a PON in operation to certify phase 2 of the installation.

FIG. 3 shows the scheme of a PON network in operation wherein the OLT 1 in operation of the telephone central office 46 has already been installed. In this case, the installer desires to certify the installation of the last fibre leg 7, including its connectors. To achieve the foregoing, it will lay the fibre until reaching the subscriber and will connect the Remote Testing Unit 13 to the subscriber wall socket 8 by means of a perfectly characterized fibre 14. The RTU 13 will automatically detect that an OLT in operation is found in the head-end and will carry out the following operations:

It will measure the downward power received;

It will attempt to register with the head OLT. The installer would have previously supplied the RTU with the user authentication data.

By means of a reflection-detecting optical circuit, the RTU will be capable of measuring the reflected power by detecting the presence of reflection in the last leg of the network. This reflection-detecting circuit uses the emission mechanisms contemplated in the PON protocol, due to which it will not disrupt the rest of the users.

It will calculate the downward bit error rate.

It will establish the services via OMCI and, if the operator has servers enabled against which to check them, it will evaluate the quality of experience of the same.

After carrying out these steps, the RTU 13 will generate an exhaustive report with the diagnostics of the tests and will sign it digitally, the installer being able to download it by means of a PC or similar to take it to the information systems containing the characterization of the fibres of the operator.

Just like an advance reader may be able to deduct, this same procedure can be carried out by the installer if the user presents a service complaint to the operator to detect failures and faults of a PON network in service.

On the other hand, in order to simplify the description, a reference is made at all times to the mature GPON (Gigabit-Capable Passive Optical Network) technology, which may be applied to any previous PON technology, such as APON, BPON, EPON, or future PON technology, such as XGPON-1, XGPON-2, EPON 10G, and to any other technology that does not exist yet, derived from the continuous TDM transmission in the downward direction and the burst transmission in the upward direction.

Figure 4:
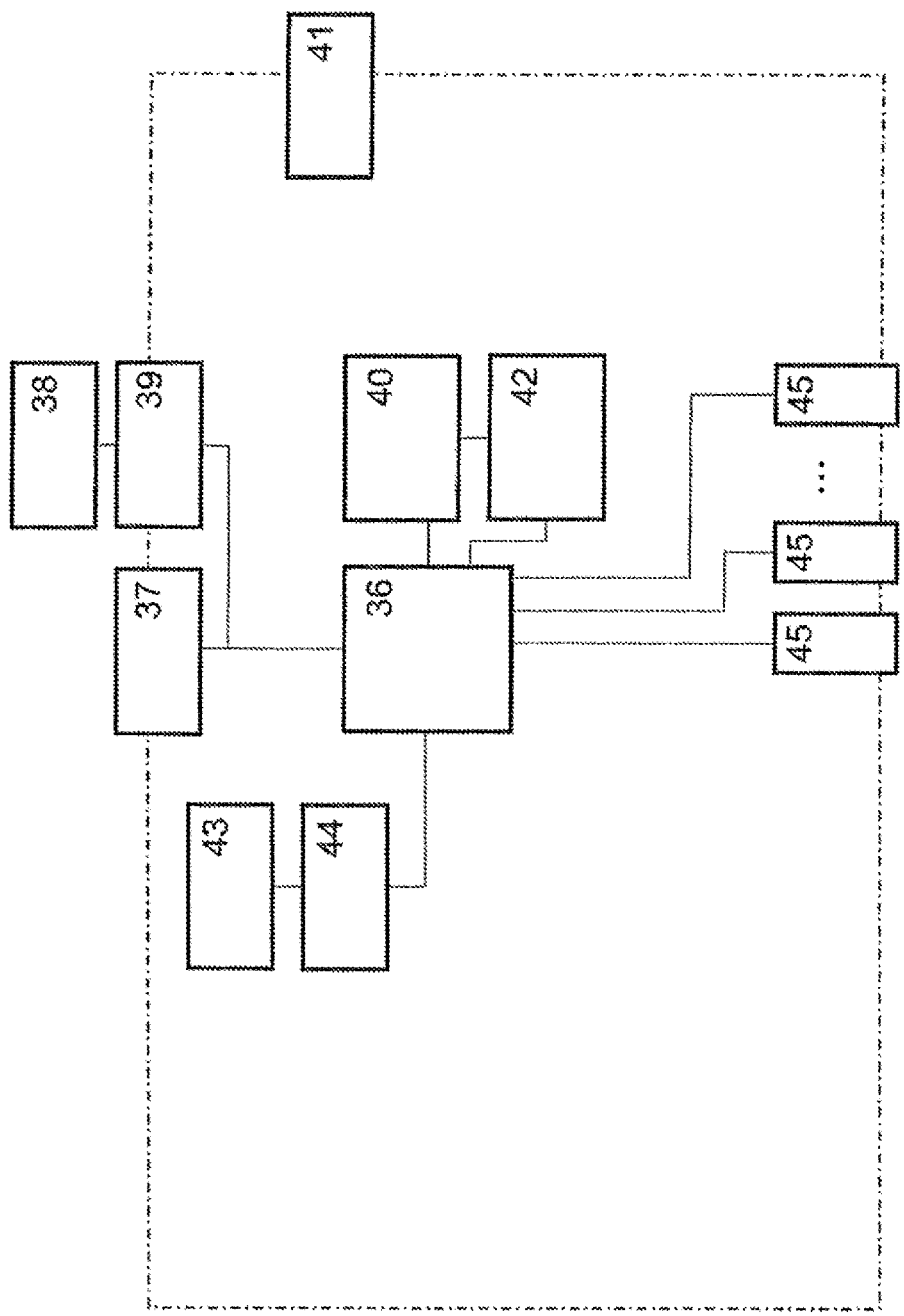
FIG. 4. Shows the block diagram of the 'OLT emulator'.

FIG. 4 shows the block diagram of the OLT 1 emulator in detail, which is similar to the circuitry of an OLT with its ASIC (Application-specific Integrated Circuit) or FPGA (Field-Programmable Gate Array) 36, which implements the GPON protocol on one or several electro-optical modules 45 (which may be connected to different PON networks), with the capacity to measure optical power and its Flash memory 43 and RAM 44 peripherals.

The main difference is that the aggregate traffic output port of the PON is interconnected to an FPGA or a dedicated packet processor 40 in order to generate the traffic of the services to be tested. In addition, the OLT emulator 1 has a dedicated microprocessor 42 to control the provision and testing functions. On the other hand, an OLT in operation is usually in the form of a card inserted in a chassis supplied according to the typical DC supply present in the telephone central. In the case of the OLT emulator, we chose to insert the entire set in a portable box with a dual and universal supply source to facilitate the mobility of the set.

The firmware executed by the control microprocessor 42 will allow the execution of downward optical level measurements, the activation of the mechanisms of the GPON protocol to register new RTUs, as well as the activation of the services and the generation of connections for the same (for example, the internet access traffic simulator with maximum throughput, packets marked for the measurement of jitter, IPTV traffic—IP television, or SIP traffic—Sign-In Protocol, to test IP telephony, etc.).

In addition, given that several simultaneous measurements could be carried out from different RTU units, the firmware of the OLT emulator will be in charge of queuing the remote petitions to execute them when the testing resources are available.

Even though this device is autonomous and does not require configuration, several USB external data ports and Ethernet 37 will allow the connection of the device to a PC 38 to update the firmware. The device also includes LEDs 41 that indicate the basic status of the device to the operator.

The Remote Testing Unit RTU can operate by facing an OLT emulator with the advanced characteristics detailed in the summarized description of the invention and with more reduced characteristics when facing an OLT in operation.

Figure 5:
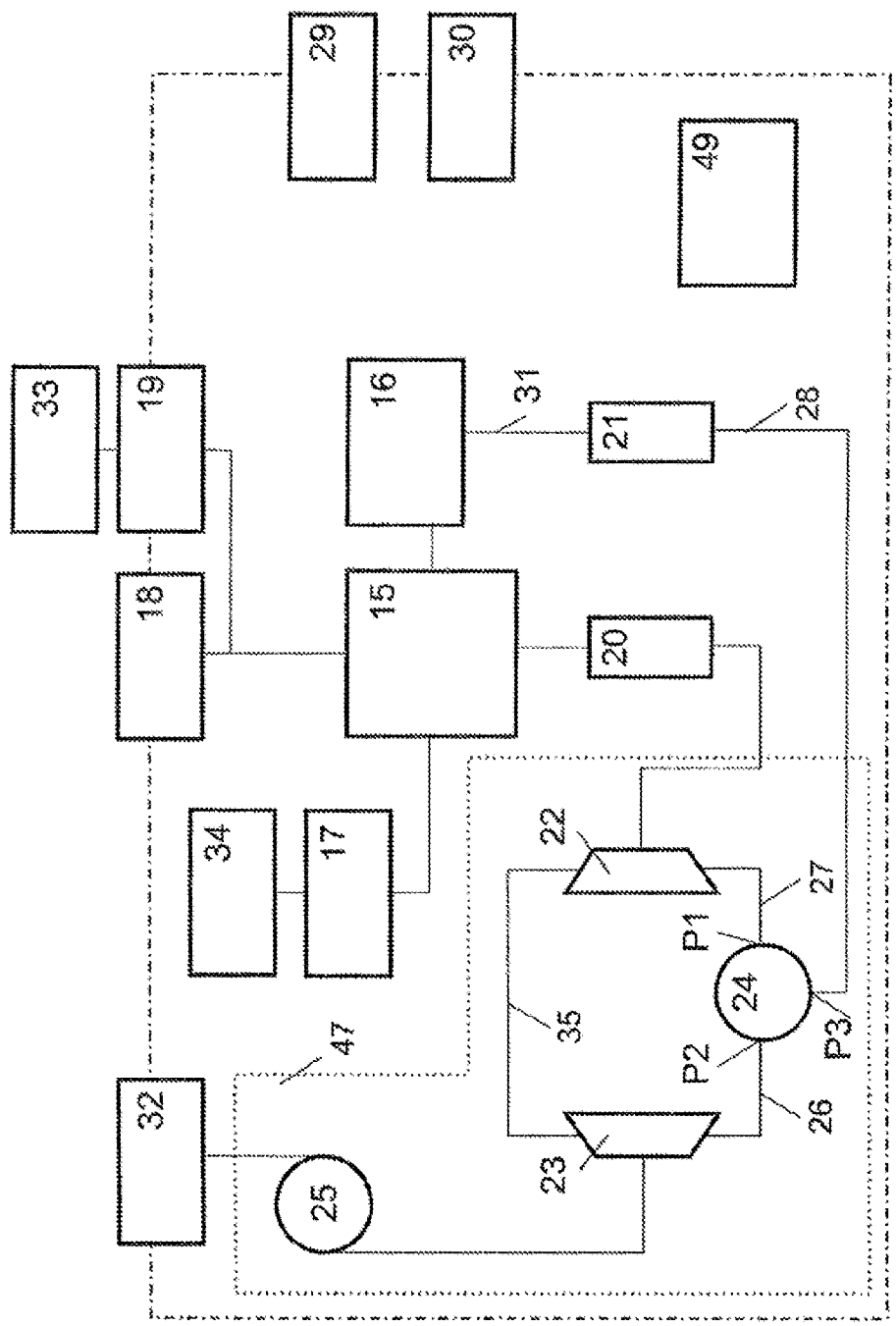
FIG. 5. Shows the block diagram of the Remote Testing Unit (RTU).

FIG. 5 shows the block diagram of the RTU in detail, such that the main core thereof is a GPON chipset or an FPGA 15 with an embedded microprocessor along with its RAM 34 and Flash 17 peripherals, which fully implement the GPON protocol and allow accessing low-level parameters of the protocol. This chipset/FPGA 15 is joined to an ONT electro-optical module 20, provided with the precise functionalities for measuring the optical power received.

This ONT electro-optical module 20 is connected to an optical circuit capable of separating the reflected light 28 (at 1310 nm) and sending it to a second OLT electro-optical module 21 with the capacity to measure power. The optical circuit takes the fibre coming from the ONT module 20 and attacks a first optical filter 22, capable of separating the downward wavelength (1490 nm) 35 from the upward wavelength (1310 nm) 27.

The output 27 of the first filter 22 at 1310 nm attacks a first port (P1) of an optical circulator 24. A second port (P2), of the aforementioned optical circulator, will connect to a second optical filter 23 to recover the monofibre signal, along with a downward wavelength signal (1490 nm) 35 coming from the first filter 22. In order to detect the reflection from the connections emitted in the OLT module 21, the PIN (reset pin) 31 must be activated moments prior to the reception of the connections.

To achieve the foregoing, the aforementioned PIN 31 needs to be connected to a digital logic block 16 communicated to the activation of the burst transmission of the ONT module 20. The design of this reflection-detecting circuit 47 includes a small optical fibre coil 25 that may be help to adjust the time delays of the system depending on the different manufacturers of optical modules.

The second port of the fibre coil 25 ends in an SC type optical connector or equivalent, always with an APC polish to minimize reflection.

The RTU, being a portable and autonomous field device, includes a latest-generation lithium polymer type battery block 49 or equivalent.

On the other hand, an external PC 33 acts as a display device connected to the RTU by means of an external USB-type connector 19 that allows the uploading, capture, and storage of the measurements made by the device and the RSA reports signed by the chipset/FPGA microprocessor 15 to be sent to the network management or operation and maintenance units of the operator.

The RTU is completed with Ethernet connectors 18 for future uses or data traffic extraction of the PON, a set of LEDs 29 that show the basic status of the tests, and a button 30, that allows an autonomous testing mode indicating the status of the test on the aforementioned LEDs 29.

Figure 6:
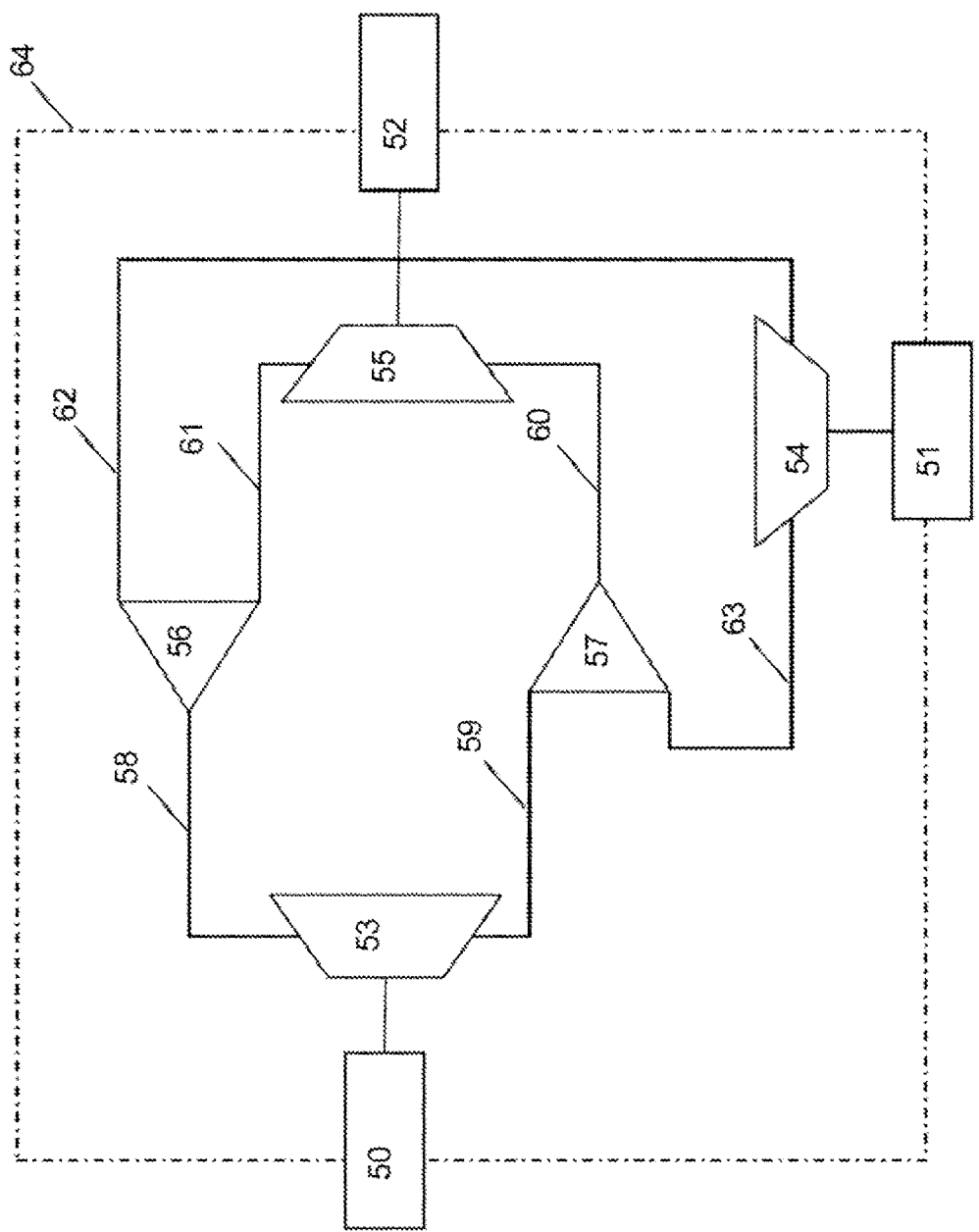
FIG. 6. Shows the block diagram of the step coupler (SC).
Figure 7:
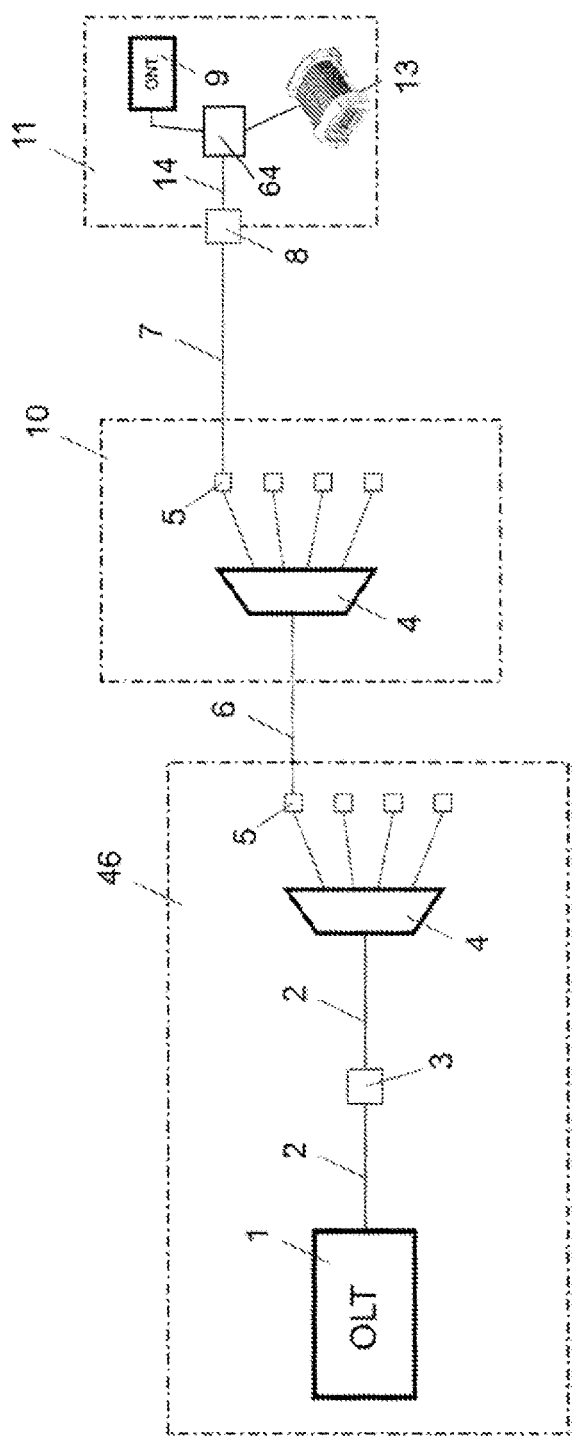
FIG. 7. Shows the diagram of a practical embodiment wherein, in a passive optical network, a step coupler alternates between the subscriber wall socket and the user device and the remote testing unit.

FIG. 7 shows the use of the step coupler SC 64 to carry out measurements on the operation of the network user ONT 9, for which, according to what is represented in FIG. 6, the PON port 50 of the SC is connected to the optical wall socket 8 and the ONT port 52 of the SC is connected to the user ONT 9 and to its test port 51 to the RTU 13.

Thus, the step coupler SC 64 allows passing the upward and downward signals between its PON port 50 and the ONT port 52 of the same, by extracting a small percentage of both signals which are combined and transmitted by the test port 51.

The RTU 13 is connected to the test port 51 and proceeds to carry out the necessary service measurements: power measurement at 1490 nm. and 1310 nm. in bursts, by using the aforementioned circuits. This way, we can determine that the power reaching the user ONT 9 falls within certain criteria determined by the standards, and that the power transmission to said user ONT 9 falls within the transmission margins defined by competent standards.

In order to extract the downward signal, the step coupler SC 64 connects its PON port 50 to the optical user wall socket 8, such that the signal enters through said PON port 50 of the SC, reaching a first window optical filter 53 sending the downward signal through 58 towards a first optical divider 56. Said first optical divider 56 lets the majority of the light 61 pass through up to a second filter 55 that sends the downward signal to the ONT connector 52 of the step coupler SC 64. The first divider 56 extracts part of the signal arriving through 58 and redirects it to a third filter 54 that allows it to pass towards the test connector 51 of the SC.

On the other hand, the upward signal reaches the step coupler SC 64 from the user ONT 9 through the ONT port 52 of the SC, reaching the second filter where it is redirected by 60 until the second optical divider 57. The majority of the signal is redirected to the first filter 53, where it goes to the connector of the PON port 50 of the SC. Part of the upward signal also passes from the second divider 57 through 63 until the third WDM filter and from it, to the test connector 51.

The result is that a small part of the signal entering the PON port 50 of the step coupler SC 64 and another small part of the signal entering through the ONT port 52 of the step coupler SC 64 are directed to the test connector of the step coupler SC 64, where it will be connected to the RTU to measure the power of the extracted signals.

Therefore, we have a passive optical circuit capable of allowing the passage of two-directional optical signals, extracting a percentage thereof without altering its content and a passive optical aggregator that concentrates all the optical signals extracted in a single port to be connected to the RTU.

The invention claimed is:

1. System for the certification of a passive optical network and for the detection of problems and faults in the last fibre legs, which is suitable for use in passive optical networks which, between the OLT device housed in a telephone central office and the user device of ONT, connected to the corresponding wall socket, and including optical dividers or splitters which, in the downward direction, distribute the optical signal to all of the users within a tree-and-branch architecture, and in the upward direction, combine the optical signals from all of the ONTs, using two supplementary transmission and reception windows with the use of a monofibre plant for the FTTH deployments, characterized in that the system comprises:
   a portable and autonomous OLT emulator device connected to the wall socket to access the plant infrastructure; and
   a remote testing unit (RTU) connected to the subscriber wall socket
such that the OLT emulator comprises:
   an ASIC or FPGA (36) implementing the GPON protocol on at least one electro-optical module (45) connectable to different PON networks with the capacity to measure optical power and flash memory (43) and RAM (44) peripherals;
   a packet processor (40), connected to the FPGA (36) to generate the service traffic to be tested, and a second microprocessor (42) dedicated to the control of the provision and testing functions;
   at least one external USB external data port (39) and an Ethernet port (37) to connect to an external PC (38) to update firmware,
while the remote testing unit (RTU) comprises:
   a GPON chipset or an FPGA (15) with an embedded microprocessor with flash memory (17) and RAM (34) peripherals;
   an ONT electro-optical module (20), joined to the chipset or FPGA (15), to measure the optical power received;
   an optical circuit (47) capable of separating reflected light (28) and sending it to an OLT electro-optical module (21) with the capacity to measure power;
   a first optical filter (22) that communicates with the ONT electro-optical module (20) capable of separating the downward wavelength (25) from the upward wavelength (27);
   an optical circulator (24) with a first port (P1) connected at the 1310 nm output of the first optical filter (22), as well as with a second port (P2) connected to a second optical filter (23) to recover the monofibre signal along with the descending wavelength (26) coming from the first filter (22);
   a PIN (31) that can be activated to detect the reflections of the connections emitted in the OLT electro-optical module (21) and which PIN (31) is connected to a digital logic block (16) that communicates with the activation of the burst transmission of the ONT electro-optical module (20);
   an optical fibre coil (25) connected to an optical connector (32) with an APC-type polish;
   a USB-type external connector (19) and an Ethernet-type external connector (18) for the connection to an external PC (33); and
   a Lithium-Polymer battery block (49) that ensures the autonomy and portability of a field system that does not require electricity to operate.

2. System for the certification of a passive optical network and for the detection of problems and faults in the last fibre legs according to claim 1, characterized in that when the RTU (13) faces an OLT emulator (12), it allows the characterization or the ringing of a PON architecture by testing the attenuation of all the branches until the CTI premises (10), as well as the establishment and verification of the negotiation procedures based on the protocol used in the PON.

3. System for the certification of a passive optical network and for the detection of problems and faults in the last fibre legs according to claim 1, characterized in that when the RTU

(13) faces an OLT in operation (1), it allows verifying the installation of the last fibre leg (6) connecting the CTI premises (10) with the user wall socket (8) by checking physical parameters, such as the power received and the reflection level, parameters of the link layer such as the negotiation and the bit error rate, and parameters of the quality of service (QoS) and of the quality of experience (QoE), all of which is carried out without disrupting the traffic of the rest of the PON users.

4. System for the certification of a passive optical network and for the detection of problems and faults in the last fibre legs according to claim 1, characterized in that when the RTU (13) faces an OLT in operation (1), it allows the detection of failures and faults with respect to the complaints of customers in an operating access circuit by checking physical parameters such as the power received and the reflection level, parameters of the link layer such as the negotiation and the bit error rate, and parameters of the quality of service (QoS) and of the quality of experience (QoE), all of which is carried out without disrupting the traffic of the rest of the PON users.

5. System for the certification of a passive optical network and for the detection of problems and faults in the last fibre legs according to claim 1, characterized in that the optical circuit (47) is capable of separating the upward light in the burst that is not generated by the RTU and to measure its power.

6. System for the certification of a passive optical network and for the detection of problems and faults in the last fibre legs according to claim 1, characterized in that the internal electronic circuit of the FPGA measures, with a precision of 5 ns., the time elapsed from the initiation of the ONT electro-optical module (9) until the detection of the signal by the OLT electro-optical module, thus measuring the distance to a possible reflection in the fibre.

7. System for the certification of a passive optical network and for the detection of problems and faults in the last fibre legs according to claim 1, characterized in that the internal electronic circuit of the FPGA, by means of the OLT electro-optical module, detects light bursts at 1310 nm. that are not generated by the RTU (13), and measures their power.

8. System for the certification of a passive optical network and for the detection of problems and faults in the last fibre legs according to claim 1, characterized in that a step coupler SC (64) is incorporated between the optical subscriber wall socket (8) and the user device or user ONT (9) and connects the Remote Testing Unit (RTU) (13) to a test port (51) of the step coupler SC (64), the Remote Testing Unit (RTU) (13) being able to measure the power received by the user device or user ONT (9) and the power transmitted by the same and to verify in an automatic manner whether said power is within certain parameters, including said information in a final report about the installation and the connected active devices.

9. System for the certification of a passive optical network and for the detection of problems and faults in the last fibre legs according to claim 1, characterized in that the Step Coupler SC (64) comprises:
- three optical connectors, two of them, one in the PON port (50) and the other in the ONT port (52) of the step coupler SC (64), to connect between the optical subscriber wall socket (8) and the user ONT (9), and the other, in the test port (51) of the step coupler SC (64) to connect to the RTU (13);
- a first and a second optical filter (53 and 55) that separate the two optical transmission windows;
- a first and a second optical divider (56 and 57) that extract a percentage of the signals contained in the extracted optical windows;
- a third WDM optical filter (54) that will concentrate the extracted signals in a single optical port.

* * * * *